United States Patent [19]
Neumann

[11] Patent Number: 4,684,216
[45] Date of Patent: Aug. 4, 1987

[54] AUTOMOTIVE OUTSIDE REARVIEW MIRROR

[75] Inventor: Bernhard Neumann, Russelsheim, Fed. Rep. of Germany

[73] Assignee: General Motors Corporation, Detroit, Mich.

[21] Appl. No.: 759,953

[22] Filed: Jul. 29, 1985

[30] Foreign Application Priority Data

Jul. 28, 1984 [DE] Fed. Rep. of Germany ....... 3427988

[51] Int. Cl.⁴ .......................... G02B 7/18; G02B 17/00
[52] U.S. Cl. ............................................................ 350/279
[58] Field of Search ......................................... 350/279

[56] References Cited

U.S. PATENT DOCUMENTS 3,253,509 5/1966 Peters .
3,612,666 10/1971 Rabinow ............................. 350/279
3,836,235 9/1974 Russell ................................ 350/280

FOREIGN PATENT DOCUMENTS 2623386 12/1977 Fed. Rep. of Germany .

*Primary Examiner*—John K. Corbin
*Assistant Examiner*—Rebecca D. Gass
*Attorney, Agent, or Firm*—Edward J. Biskup

[57] ABSTRACT

The invention relates to an outside rearview mirror for mounting on the driver's side of a motor vehicle which is adapted for pivoting movement towards the side of the vehicle operator about an axis which is disposed substantially vertically with respect to the plane of vehicle movement, the pivoting being effected by means of a reversible electric motor, so as to eliminate the glare to the vehicle operator if the headlights of a following vehicle are reflected by such a mirror.

3 Claims, 3 Drawing Figures

AUTOMOTIVE OUTSIDE REARVIEW MIRROR

The invention relates to an automotive outside rearview mirror mounted on the side of the vehicle operator that is pivotable, in the direction of the side of the vehicle operator, about an axis extending substantially perpendicular to the plane of vehicle movement, said pivoting movement being effected by a reversible electric motor means.

Outside rearview mirrors of this type are generally known in the art. The reversible drive means is usually in the form of an electric motor which is adapted to be activated or deactivated by means of an electric switch, and which is operative to effect the desired pivoting movement of the outside rearview mirror. The operation of these outside mirrors is such that the vehicle operator, without opening the side window of the vehicle and with very little effort, is able to cause the mirror to be moved into a normal position which is most suitable to him. This normal rearview mirror position is to be maintained afterwards so that the vehicle operator, while being in his customary seating position, is afforded the proper viewing angle towards the rear through the outside rearview mirror. However, this arrangement has the disadvantage that when the outside rearview mirror is in its normal position, the vehicle operator is subjected to glare when the light beams emitted by the headlights of a following vehicle are reflected by the outside rearview mirror. In such instance, the vehicle operator has no choice other than to endure the glare, i.e., to remain in his normal driving position, because this is the only way for him to keep control by way of his inside rearview mirror over some of the visual area towards the rear.

It has already been proposed in German Offlegungsschrift patent DE-OS No. 26 23 386 to use an outside rearview mirror which is adapted for pivoting movement about an axis which extends substantially parallel to the plane of vehicle movement. The mirror described in the aforesaid patent is of the type wherein the light reflectivity of the surface on the one side of the mirror is normal, whereas the light reflectivity of the surface on the rear side, i.e., the other side of the mirror, is relatively weak. If a mirror of this type is adapted for pivoting through an angle of 180° about the axis mentioned above, the mirror, while remaining in its normal viewing position, would expose to the vehicle operator in one instance its normal reflective surface, and in the other instance its surface that is only slightly reflective, so that in the latter instance the driver would not be subjected to glare. However, the obvious shortcoming of this arrangement is that during the 180° pivoting movement of the mirror the vehicle operator is left without the benefit of the outside rearview mirror and is therefore during this time deprived of the view towards the rear.

It is the object of the present invention to provide an outside rearview mirror of the type described above which is adapted for movement into a glare-free position but which, nevertheless, affords the vehicle operator a view towards the rear of the vehicle during the change-over period from the glare to the non-glare position.

This object is achieved in accordance with the invention in that the outside rearview mirror is adapted for momentary pivoting movement from a predetermined normal position towards the side of the vehicle operator. This arrangement will cause a following vehicle, which ordinarily would cause glare, to be outside the viewing area reflected by the rearview mirror. This is particularly advantageous in those instances in which the following vehicle is approaching or about to overtake along the driver's side the vehicle equipped with the subject mirror, because in such instances the operator of the leading vehicle will not be subjected to glare caused by the headlights of the following vehicle after the outside rearview mirror has been pivoted from its normal position towards the side of the vehicle operator. For the purpose of this invention, "momentary pivoting movement" means that after actuating the switchable control device, the outside rearview mirror will be placed in a non-glare position and, after actuating the switch again, can be returned automatically to its original position. The release of the reversible drive means may also be initiated by means of an interval switch which need be actuated only once, namely at the beginning of the pivoting movement towards the side of the vehicle operator. If an interval switching circuit is being employed, the outside rearview mirror will remain for a predetermined period of time in its pivoted position towards the side of the vehicle operator and will automatically return thereafter to its original normal position.

A preferable arrangement is one in which the outside mirror is momentarily pivotable through a predetermined angle such as 4.5 to 5.5 degrees towards the side of the vehicle operator. The angle of movement towards the driver should be sufficient to remove the glare from the driver's eyes, and for most applications within the framework of this invention, should provide the driver with a satisfactory viewing range towards the rear through the outside rearview mirror.

Since the pivoting movement of the outside rearview mirror according to this invention is, essentially, continual, the view of the vehicle operator through the outside rearview mirror is also continual, i.e., there is no time interval during which the view of the vehicle operator towards the rear is blocked out.

Preferably, the switching means for the electric motor drive means is mounted in the area of the steering wheel, as for instance on the dashboard or on one of the control levers, such as the headlight or the windshield wiper actuating lever. Thus, the driver need not search with his hand, as is the case with one of the prior art outside rearview mirrors, for the switching device in an area away from the steering wheel. Furthermore, there is no need for the driver to readjust the outside rearview mirror by cumbersome manipulation back into its normal position, a task which is even more difficult during night driving.

All in all, the outside rearview mirror according to this invention is the first mirror which, while incorporating the well-known feature of pivotability, can be made glare-free without causing any interruption in the driver's ability of viewing, and without interfering with the steering or other vehicle control operations.

Other features and advantages of the present invention will be more apparent from the following detailed description when taken with the drawings in which.

Figure 1:
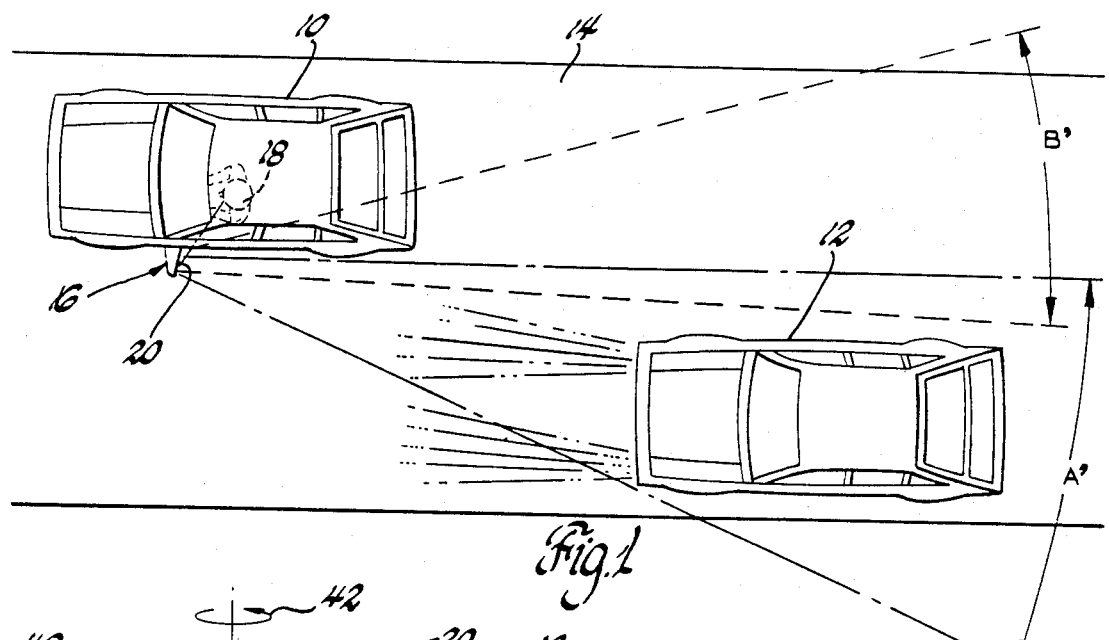
FIG. 1 is a plan view of two vehicles traveling in the same direction with the following vehicle being in the passing lane and being spaced a distance which causes its headlights to be reflected into the eyes of the driver of the leading vehicle by the outside rearview mirror thereof.

Referring now to the drawing and more particularly FIG. 1 thereof, two vehicles 10 and 12 are shown traveling along a two-lane highway 14 in the same direction; the leading vehicle 10 being in the curb or outside lane while the following vehicle 12 is located in the inside or passing lane. As is well known, during nighttime, when two vehicles are located in the relative positions shown and the outside rearview mirror 16 of the leading vehicle 10 is positioned so as to provide the driver thereof with a normal rearward view that provides a field of vision as indicated by the angle A', the headlights of the following vehicle 12 will be reflected by the outside rearview mirror 16 of the leading vehicle 10 into the eyes of the driver 18 of the leading vehicle 10. This occurs because the headlights of the following vehicle 12 are located within the aforesaid field of vision defined by the angle A'. In order to eliminate the glare of the headlights of the following vehicle 12, the driver 18 of the leading vehicle 10, will cause the mirror element 20 of the outside rearview mirror 16 to pivot a predetermined amount about a vertical axis, in accordance with the present invention, towards the driver 18 of the leading vehicle 10 so as to cause the driver 18 to have the rearward field of vision indicated by the angle B'. In the nonglare position of the mirror element 20, the headlights of the following vehicle 12 will be outside the viewing area reflected by the outside rearview mirror 16 and, accordingly, the driver 18 will no longer be subjected to the headlight glare of the following vehicle 12.

Figure 2:
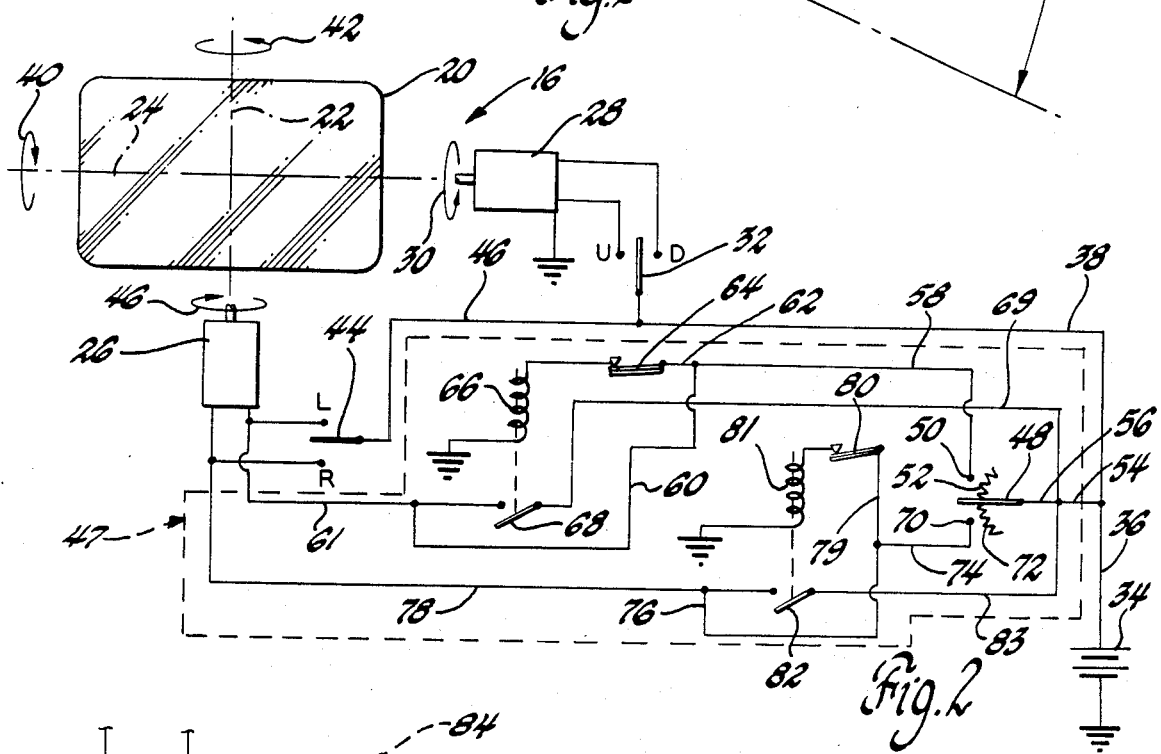
FIG. 2 is a schematic view of the outside rearview mirror according to the present invention mounted on the driver's side of the leading vehicle of FIG. 1 and that is controlled by an electric circuit.

The outside rearview mirror 16 which will provide the desired movement of the mirror element 20 from a normal viewing position to the non-glare position as described above can be seen in FIG. 2 of the drawing. More specifically, the outside rearview mirror 16 has the mirror element 20 supported in a conventional manner for controlled movement about a vertical axis 22 and for controlled movement about a horizontal axis 24. Movement of the mirror element 20 about the vertical axis 22 is provided by a drive means such as a reversible electric motor 26 while movement of the mirror element 20 about the horizontal axis 24 is provided by a drive means such as a reversible electric motor 28. Thus, when the driver 18 of the vehicle 10 wishes to adjust the position of the mirror element 20 about the horizontal axis 24 in the direction indicated by the arrow 30 so as to tilt the upper part of the mirror towards the viewer and the lower part of the mirror away from the viewer as seen in FIG. 2, a motor control switch 32 will be pivoted in a clockwise direction to engage a contact D to connect a battery 34 via conductors 36 and 38 to the winding "D" and energize such winding of the reversible motor 28 to cause such movement. When the mirror element 20 attains the desired position, the control switch 32 is returned by the driver to the full line neutral position shown so as to deenergize the "D" winding of motor 28. If the driver desires to move the mirror element 20 in the opposite direction about the horizontal axis as indicated by the arrow 40, the control switch 32 is pivoted in the counterclockwise direction to engage contact U to energize the "U" winding of the motor 28 for reverse movement of the mirror element 20. Again, when the mirror element 20 attains the desired position, the control switch 32 is returned to neutral full line position shown in FIG. 2.

Movement of the mirror element 20 about the vertical axis 22 is similarly realized. Thus, when it is desired to move the mirror element 20 towards the driver 18 about the vertical axis 22 in the direction of the arrow 42 so that the left edge of the mirror element 20 moves towards the viewer while the right edge moves away from the viewer, a motor control switch 44 is pivoted in a clockwise direction into engagement with a contact L to connect the battery 34 via conductors 36, 38 and 46 to the "L" winding to energize such winding of the motor 26 and cause such movement. When the mirror element 20 attains the desired position, the control switch 44 is returned by the driver to its full line neutral position, the motor 26 is deenergized and the mirror element 20 maintains its position. Counterclockwise movement of the control switch 44 so as to engage contact R causes energization of the other winding "R" of the motor 26 so that the mirror element 20 reverses its movement causing the mirror element 20 to rotate in a direction of the arrow 46.

In operation, when the mirror element 20 is prepositioned, by actuation of the motors 26 and 28, in the normal driving position so that the driver 18 of the leading vehicle 10 can observe the rearward field of vision indicated by the angle A', and when the following vehicle 12 approaches from the rear, as shown in FIG. 1, the headlights will be reflected by the mirror element 20 into the eyes of the driver 18 of the leading vehicle as herebefore mentioned. With the present invention, however, when this occurs the driver 18 of the leading vehicle 10 need only activate a nonglare control circuit 47 by moving a separate conveniently located switch 48 to cause momentary engagement with a contact 50 after which the switch 48 is released and immediately returns to its neutral full line position by a spring 52. Upon the momentary engagement of the switch 48 with the contact 50, the "L" winding of the motor 26 is energized causing the motor 26 to rotate about the vertical axis 22 towards the driver in the direction of the arrow 42. As seen in FIG. 2, the "L" winding of the motor 26 is energized due to the momentary contact of the switch 48 with contact 50 which serves to connect the battery 34 through conductors 36, 54, 56, 58, 60 and 61 to the "L" winding of the motor 26. Simultaneously, a holding or preset time release circuit is established through conductors 62, a bi-metallic normally closed switch 64 and a relay coil 66 which when energized closes a normally open switch 68. Thus when the switch 48 is released after momentary engagement with the contact 50, the holding or timing circuit continues energization of the winding "L" of the motor 26 through conductors 36, 54, 69, closed switch 68 and conductor 61. The motor 26 will rotate the mirror element 20 for a predetermined time interval as determined by the bi-metallic switch 64. In this instance, the bi-metallic switch 64 selected will stay closed for only a second or two and then automatically open to deenergize the relay coil 66 causing the switch 68 to open to deenergize the winding "L" of the motor 26. During such time the mirror element 20 will rotate sufficiently to remove the headlight glare from the eyes of the driver 18. This could be the aforesaid 4.5 to 5.5 degrees of movement of the mirror element 20 towards the driver. As seen in FIG. 1, when this occurs, the mirror element 20 pivots towards the driver 18 so that the rearward field of vision is represented by the angle B'.

Once the following vehicle 12 passes the leading vehicle 10, the switch 48 can be moved by driver again but this time to momentarily engage contact 70 and when the switch 48 is released, a spring 72 returns the switch 48 to the full line neutral position shown. By so doing, the battery 34 is connected through conductors 36, 54, 56, 74, 76 and 78 to the winding "R" of the motor 26 to reverse the direction of movement of the mirror element 20 and cause it to move in the direction of the arrow 46. At the same time, a holding circuit operatively associated with winding "R" is established. In this regard, the battery 34 is connected through switch 48, conductors 74 and 79, and a bi-metallic switch 80 to a relay coil 81 which when energized closes a normally open switch 82 which connects winding "R" to battery through conductors 78 and 83. The bi-metallic switch 80 is identical to the bi-metallic switch 64 so that it stays closed for the same length of time and opens automatically afterwards at which time the mirror element 20 is repositioned at its original position so as to again provide the driver with the rearward field of vision indicated by the angle A'.

Figure 3:
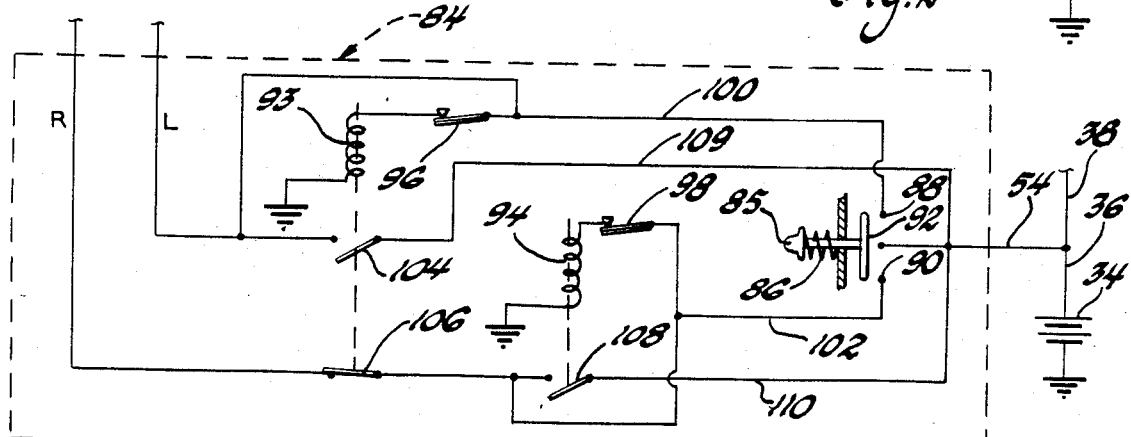
FIG. 3 is a schematic view of a modified form of the electric circuit seen in FIG. 2 that can be used for controlling the outside rearview mirror shown in FIG. 1.

FIG. 3 shows a modified control circuit 84 which can be substituted for the control circuit 47 shown in FIG. 2. In this case, the control circuit 84 serves to move the mirror element 20 about the vertical axis 22 towards the driver 18 and afterwards automatically returns the mirror element 20 to the original position. Thus, when the button 85 is moved to the right against a spring 86 as seen in FIG. 3 and released, the contacts 88 and 90 are simultaneously and momentarily connected to the battery 34 by the switch blade 92. As a result, the relay coils 93 and 94 are connected to battery 34 through the normally closed bi-metallic switches 96 and 98 and conductors 100 and 102, respectively. The relay coil 93 when energized will close normally open switch 104 and open normally closed switch 106. While relay coil 94 when energized will close the normally open switch 108. Thus when this occurs, the "L" winding of the motor 26 will be connected to battery 34 and energized via conductors 36, 54, 109 and switch 104 causing the motor 26 to rotate the mirror element 20 towards the driver as explained above. The bi-metallic switch 96 will maintain its closed position for the same time interval as bi-metallic switch 64 and then open to deenergize the relay coil 93 and open switch 104 at which time the motor winding "L" is deenergized and the mirror element 20 will have rotated sufficiently to present the field of vision indicated by the angle B' so as to remove the glare of the headlights of the following vehicle 12. In addition, when the relay coil 93 is deenergized causing the normally open switch 104 to open, the normally closed switch 106 will close. This will cause the winding "R" to be energized through the closed switch 108 which is connected to battery 34 through conductors 110, 54 and 36. Energization of winding "R" causes the motor 26 to reverse direction so mirror element 20 will begin to return to its original position. The bi-metallic switch 98 is designed to be closed for a time period which is double the time period of the bi-metallic switch 96. Thus after the switch 106 is closed, as explained above, the bi-metallic switch 98 will maintain winding "R" energized and then open at which time relay coil 94 will be deenergized causing switch 108 to open to deenergize the motor 26 so that the mirror element 20 will be located at its original position again.

Various changes and modifications can be made in the above-described outside rearview mirror without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A rear view mirror mountable on the outside of the driver's door of a motor vehicle and being supported for adjustable movement about a substantially vertical axis and a substantially horizontal axis, a first electric motor and a second electric motor operatively connected to said mirror for pivoting said mirror about said vertical axis and said horizontal axis, respectively, a first electric circuit including first switch means connected to said first electric motor and said second electric motor for selectively energizing said first and second motors for positioning said mirror about said vertical and horizontal axes, and a second electric circuit for moving said mirror towards the driver of the motor vehicle from a predetermined driving position of the mirror to a nonglare position so as to eliminate the glare from the headlights of a following vehicle, said second electric circuit being connected to said first electric motor and including second switch means and a timing means for causing said first electric motor to rotate said mirror about said vertical axis from said predetermined driving position to said nonglare position where said mirror automatically stops after said second switch means is momentarily moved to an operative position.

2. A rearview mirror mountable on the outside of the driver's door of a motor vehicle and being supported for adjustable movement about a substantially vertical axis and a substantially horizontal axis, a first electric motor and a second electric motor operatively connected to said mirror for pivoting said mirror about said vertical axis and said horizontal axis, respectively, a first electric circuit including first switch means connected to said first electric motor and said second electric motor for selectively energizing said first and second motors for positioning said mirror about said vertical and horizontal axes, and a second electric circuit for moving said mirror towards the driver of the motor vehicle from a predetermined and preset driving position of the mirror to a nonglare position so as to eliminate the glare from the headlights of a following vehicle, said second electric circuit connected to said first electric motor and including second switch means and a timing means so that upon momentary actuation of said second switch means said first electric motor rotates said mirror about said vertical axis from said predetermined driving position to said nonglare position where said mirror automatically stops and afterwards momentary actuation of said second switch means causes said mirror to return from said nonglare position to said predetermined and preset driving position where said mirror again automatically stops.

3. A rearview mirror mountable on the outside of the driver's door of a motor vehicle and being supported for adjustable movement about a substantially vertical axis and a substantially horizontal axis, a first electric motor and a second electric motor operatively connected to said mirror for pivoting said mirror about said vertical axis and said horizontal axis, respectively, a first electric circuit including first switch means connected to said first electric motor and said second electric motor for selectively energizing said first and second motors for positioning said mirror about said vertical and horizontal axes, and a second electric circuit for moving said mirror towards the driver of the motor vehicle from a predetermined and preset driving position of the mirror to a nonglare position so as to eliminate the glare from the headlights of a following vehicle, said second electric circuit connected to said first electric motor and including second switch means and a timing means so that upon momentary actuation of said second switch means said first electric motor rotates said mirror about said vertical axis from said predetermined driving position to said nonglare position where said mirror automatically stops and afterwards automatically causes said mirror to return from said nonglare position to said predetermined and preset driving position where said mirror again automatically stops.

* * * * *